United States Patent [19]

Kahn: David A. et al.

[11] Patent Number: 4,872,739

[45] Date of Patent: Oct. 10, 1989

[54] OPTICAL BUSBAR

[75] Inventors: Kahn: David A., Nepean; Grant K. Pacey, Stittsville; Jaroslav M. Hvezda, Nepean; Jack F. Dalgleish, Ottawa, all of Canada

[73] Assignee: Northern Telecom Ltd., Montreal, Canada

[21] Appl. No.: 193,162

[22] Filed: May 5, 1988

Related U.S. Application Data

[63] Continuation of Ser. No. 840,262, Mar. 17, 1986, abandoned.

[51] Int. Cl.⁴ .............................................. G02B 6/28
[52] U.S. Cl. .................... 350/96.16; 250/227; 350/96.18
[58] Field of Search .............. 350/96.10, 96.15, 96.16, 350/96.18, 96.20, 96.24, 96.28, 96.29, 96.30; 250/227, 552; 362/32

[56] References Cited

U.S. PATENT DOCUMENTS

| | | | |
|---|---|---|---|
| 4,173,390 | 11/1979 | Käch | 350/96.16 |
| 4,378,143 | 3/1983 | Winzer | 350/96.15 |
| 4,383,729 | 5/1983 | Suzuki et al. | 350/96.10 |
| 4,549,782 | 10/1985 | Miller | 350/96.16 |
| 4,576,436 | 3/1986 | Daniel | 350/96.10 |
| 4,682,844 | 7/1987 | Mori | 350/96.15 |
| 4,690,490 | 9/1987 | Mori | 350/96.15 |
| 4,750,79. | 6/1988 | Blotekjaer | 350/96.15 |

FOREIGN PATENT DOCUMENTS

| | | | |
|---|---|---|---|
| 0158967 | 10/1985 | European Pat. Off. | 350/96.15 |
| 2525777 | 10/1983 | France | 350/96.15 |
| 56-111811 | 9/1981 | Japan | 350/96.15 |

Primary Examiner—John D. Lee
Attorney, Agent, or Firm—R. John Haley

[57] ABSTRACT

An optical busbar, for optically interconnecting electronic and/or photonic equipment, comprises a rod of light-transmissive material, for example polycarbonate, having a longitudinal planar surface. Preferably the rod is of polygonal cross-sectional shape. Distributed along its length, opposite the planar surface, the rod has a plurality of inclined reflector surfaces for diverting light travelling along the rod so that it emerges laterally at intervals corresponding to the spacing of the reflector surfaces. When the rod is installed on a backplane of the equipment, with a plurality of circuit cards projecting perpendicularly from the backplane, optoelectrical devices on the circuit cards are arranged to be in register with the inclined reflector surfaces. Optical signals transmitted along the optical busbar will be distributed to the circuit cards. The optical conductor will, of course, function with the light travelling in the opposite direction, i.e. transmitted from the circuit card and reflected to travel along the length of the conductor.

21 Claims, 3 Drawing Sheets

OPTICAL BUSBAR

This is a continuation of application Ser. No. 840,262 filed Mar. 17, 1986, now abandoned.

This application relates to U.S. patent application Ser. No. 840,244 filed Mar. 17, 1986.

The invention relates to optical busbars such as are used for making connections within electronic and/or photonic equipment. Photonic equipment uses light instead of electric current, e.g. uses optical communication links.

The increasing transmission rates in present-day computer and telecommunications equipment have led to the use of optical busbars, often called waveguides, for the main traffic highways, which may have to operate at rates of 1 gigabit and more. In telecommunications equipment, they have been used to interconnect circuit cards which are mounted to extend perpendicular to a backplane. (See, for example, copending patent application Ser. No. 593,682 by A. Graves (now abandoned), and assigned to the same assignee as this invention.) In such applications, the optical waveguide/busbar comprises an elongate moulding of optically transmissive plastics material.

It is desirable for such optical busbars to be manufactured cheaply in large quantities and readily mountable on backplanes and the like. To this end, one aspect of the invention provides an optical busbar comprising a rod of optically transmissive material, for example, synthetic plastics material, having a planar surface extending along the length of the rod and a plurality of reflector means, e.g. planar surfaces, each inclined relative to the longitudinal axis of the rod so as to reflect light travelling along the rod to emerge through said planar surface. Preferably the rod has a cladding or coating and a polygonal cross-sectional shape, the reflectors being inclined relative to one facet thereof, which constitutes said planar surface.

Such a polygonal rod is relatively easy to manufacture, especially when made of plastics material—of which polycarbonate is preferred. Polycarbonate is preferred not only because it allows easy manufacture and has a high melting point, but also because it has a relatively high refractive index, making it easier to find a coating or cladding material with a lower refractive index. Suitable coating materials include ceramics, for example silicon monoxide and silicon dioxide, and a typical thickness for the coating is about 1 micrometer. Such coating arrangements for waveguides or optical busbars are the subject of copending patent application Ser. No. 025,198, in the name of W. Trumble, assigned to the same assignee as this invention (now U.S. Pat. No. 4,784,877). The reflectors may be metallized inclined surfaces. Typically, the inclination will be 45 degrees to the longitudinal axis of the rod.

The polygonal form, with the reflected light emerging through a facet, is preferred to the cylindrical because it does not produce cylindrical lens effects. The latter would cause the light beam to spread by different amounts in different mutually perpendicular planes before arriving at the associated detector.

For ease of manufacture, and mounting upon the associated circuit board or backplane, the polygonal form is preferably regular. A square cross-section is especially advantageous since, provided with suitably disposed additional inclined surfaces, it allows light beams to emerge or enter in four mutually perpendicular directions. However, other shapes could be used, for example, triangular, with the light reflectors being formed by notching one apex so as to redirect light to emerge from the opposing facet.

In preferred embodiments, the reflectors comprise inclined surfaces each formed as an oblique truncation of a cavity of elliptical, especially circular, cross-section, the elliptical axis preferably extending perpendicular to said facet. Small-diameter circular cavities can be made accurately more easily than other shapes because they can be formed during moulding by means of a mitred circular rod. Precision, small-diameter circular rods are usually available more readily than precision rods of other shapes.

The last inclined reflector surface may extend completely across the end of the rod, i.e. as by mitring. The reflecting surfaces should be as close to totally reflecting as practicable. To this end, they may be coated with metal, for example, gold or aluminum.

According to another aspect, the invention comprises an optical busbar for distributing light travelling along its length to emerge at intervals along its length in a direction that is transverse to its longitudinal axis. Such optical busbar comprises means forming an elongate waveguide for conveying light along its length, and, spaced apart linearly along its length, a plurality of diverter means, each so disposed as to divert light travelling along the waveguide to emerge in a direction transverse to its longitudinal axis, or vice versa.

In preferred embodiments of this aspect of the invention, the diverter means, for example reflectors are disposed rectilinearly.

The means for defining said elongate waveguide may comprise a rod of optically transmissive material. The rod may be coated with a material having a lower refractive index than that of the rod. For example, the rod may be of plastics material and the coating may be glass.

The reflectors may have the various features mentioned earlier in relation to the first aspect of the invention. Moreover, they may be provided in the same side of the optical waveguide or on different sides. Alternatively, refraction could be used instead of reflection.

Support means for supporting said optical conductor upon a backplane or the like may comprise a seating member having a seating to cooperate with said planar surface, an anchorage for securing said seating member to said backplane, and lens means adjacent said seating.

An advantage of this support arrangement is that it facilitates alignment of the individual reflector means with the associated lens(es) and the associated optical element, for example a receiver/transmitter, on the circuit card which is located by the usual pins, which are at a predetermined location relative to the anchorage.

According to a third aspect of the invention, there is provided apparatus comprising a backplane and a plurality of circuit cards mounted to extend therefrom, and at least one (typically sets of two) optical busbar of the aforementioned first aspect mounted on said backplane. Each circuit card has an optical receiver to receive light reflected from an inclined reflector surface of the optical busbar, or an optical transmitter to direct light to the associated inclined reflector surface.

An embodiment of the invention will now be described by way of example only and with reference to the accompanying drawings in which.

Figure 1:
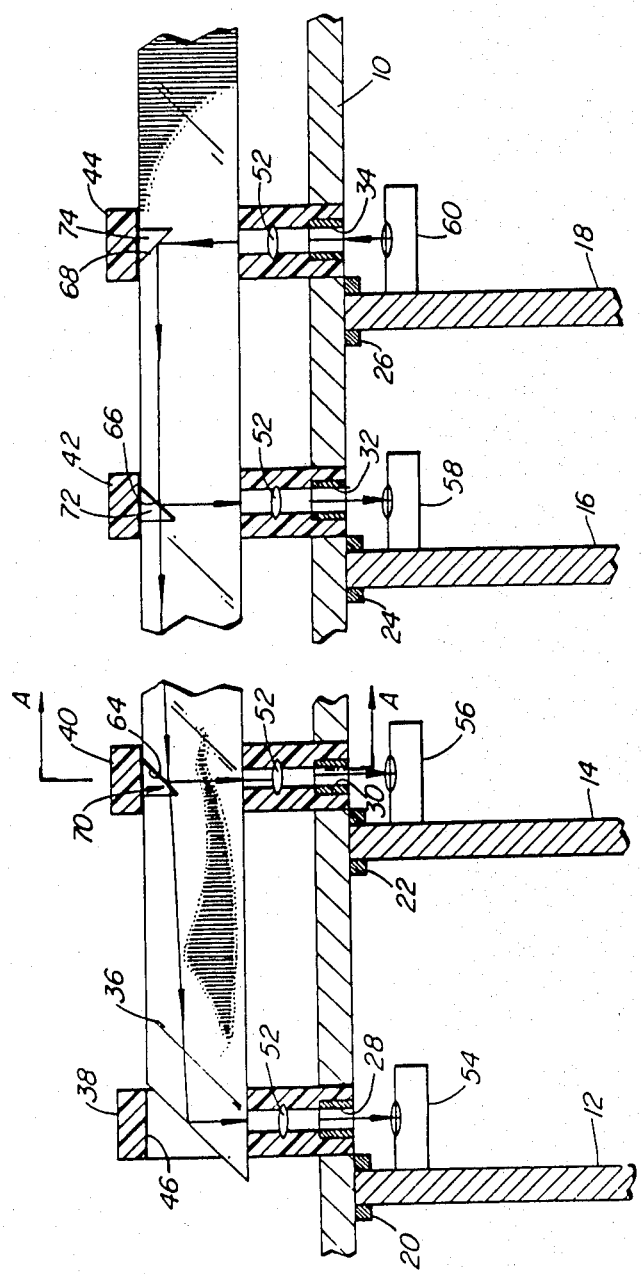
FIG. 1 is a cross-sectional view of apparatus comprising a backplane and a plurality of circuit cards, the latter interconnected optically by way of an optical busbar embodying one aspect of the invention.

Referring to FIG. 1, a backplane 10, which may be a printed circuit board or other planar member, has a plurality of circuit cards 12, 14, 16 and 18 mounted on its one face so as to extend perpendicular to the backplane 10. The circuit cards 12, 14, 16 and 18 are coupled to the backplane by electrical connectors 20, 22, 24 and 26, respectively, adjacent holes 28, 30, 32 and 34, respectively, which extend through the backplane 10. An optical busbar 36 is mounted on the opposite face of the backplane 10 by a set of seating members 38, 40, 42 and 44 spaced apart along its length, one over each of holes 28, 30, 32 and 34, respectively.

Figure 2:
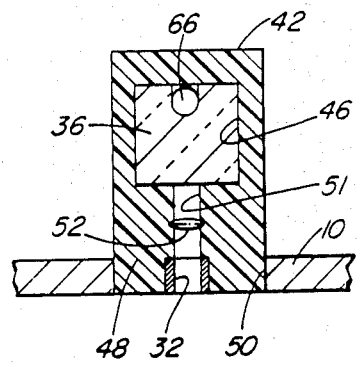
FIG. 2 is a cross-sectional fragment view on the line AA of FIG. 1.

As shown also in FIG. 2, each seating member 38, 40, 42 or 44 comprises a block of aluminum having a seating in the form of a square aperture 46 to receive and positively locate the optical busbar or waveguide 36. The optical busbar 36 has a polygonal, specifically square, cross-sectional shape and is a close fit in the aperture 46. The facets comprise planar surfaces, at least the lowermost one of which accurately locates the busbar 36 with its bottom facet parallel to the backplane 10. The base of each seating member 38, 40, 42 or 44 has an anchorage in the form of a set of spigots 48 (see FIG. 2) which project beyond the end of the seating member to engage in corresponding holes 50 in the backplane 10. The spigot holes 50 surround the corresponding one of holes 28, 30, 32 and 34 so that each seating member is located over the corresponding one of holes 28, 30, 32 and 34.

Figure 3:
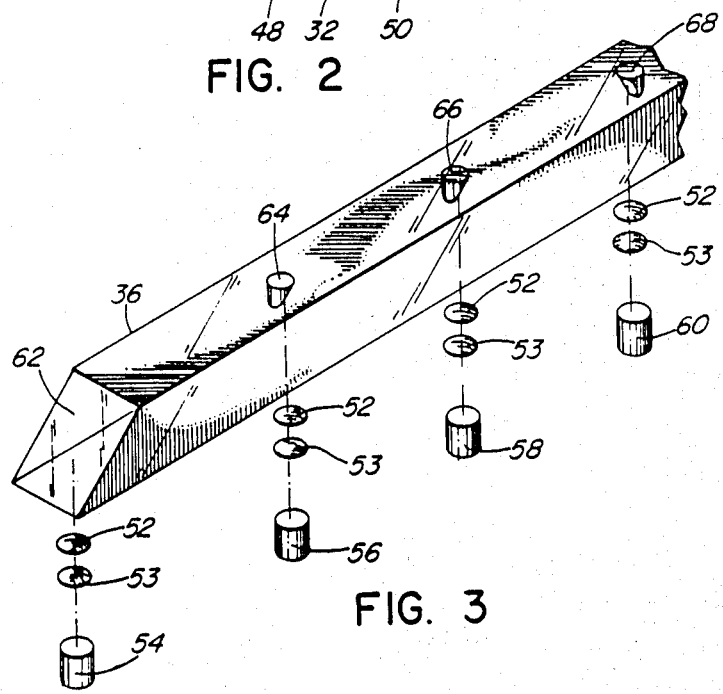
FIG. 3 is a perspective schematic view of a light conductor associated with a set of lenses and transmitters/receivers.
Figure 4:
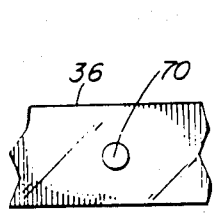
FIGS. 4, 5 and 6 are plan, side elevation and sectional views, respectively, of the light conductor.
Figure 5:
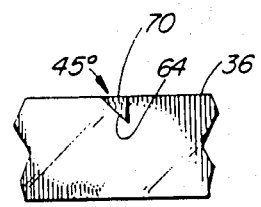
Figure 6:
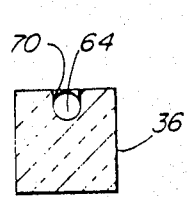

A hole or cavity 51 extends between the square aperture 46 and the anchorage end of the seating member 42. A lens 52 is supported to extend across the hole 51 between the base of square aperture 46 and the anchorage 48. Each lens 52 is arranged with its optical axis perpendicular to the longitudinal axis of the optical waveguide 36 and aligned, through the hole 28, 30, 32 or 34, with an optical element in the form of a receiver 54, 56 or 58 or an optical transmitter 60 mounted on the corresponding one of the circuit cards 12, 14, 16 and 18. The optical transmitters may be light-emitting diodes and the receivers photodiodes. Each LED or photodiode is fitted with a lens 53 corresponding to lens 52 (see FIG. 3).

Alternatively, and perhaps preferably, lasers could be used. The LED, photodiode or laser, need not be located immediately adjacent the backplane but could be positioned some distance away, possibly not even on the circuit card, and connected by means of another optical busbar or optical fiber, which then constitutes the transmitter or receiver.

As shown in more detail in FIGS. 3, 4, 5 and 6, the optical busbar 36 has a series of reflector means or taps formed by inclined planar surfaces 62, 64, 66 and 68 aligned with the lenses 52 in seating members 38, 40, 42 and 44, respectively. The inclined surfaces 64, 66 and 68 are formed as mitred ends of a series of circular cavities 70, 72 and 74, respectively (see FIG. 5). The final inclined surface 62 is formed by mitring the end of the rod 36. Each cavity 70, 72 or 74 is conveniently formed during moulding of the optical waveguide 36 by means of a mould insert in the form of an obliquely truncated round rod which may readily be obtained with the required precision. The inclined reflector surfaces 62, 64, 66 and 68 may be coated with metal, for example gold or aluminum, to maximize their reflectance. The inclined surface 68 associated with the transmitter 60 is inclined oppositely to the other inclined surfaces so that light from the transmitter 60 is reflected through ninety degrees to travel along the optical waveguide 36 parallel to its longitudinal axis. At each of the "receiver" inclined surfaces 62, 64 and 66 a portion of the light is reflected, again through ninety degrees, to pass through the associated lens 52, the backplane 10, and the receiver's lens 53, to impinge upon the receiver 54, 56 or 58. The amount of light reflected will depend upon the area of the inclined surface relative to the cross-sectional area of the rod. Typically, this will be 2-4%.

Masking or shadowing of one inclined surface by the preceding one has not been found to be a significant problem. The combination of small tap area, large inter-tap spacing, and multimode transmission serves to ensure that light by-passing one inclined reflector surface reaches the next.

Figure 7:
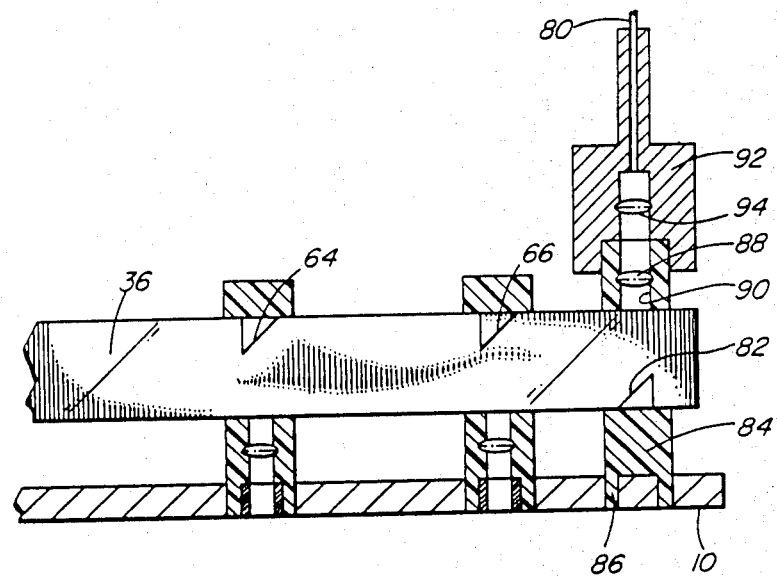
FIG. 7 is a sectional side view of an alternative embodiment in which the reflector associated with the transmitter and the reflectors associated with the receivers are on opposite sides of the optical busbar.

It may be convenient for the optical busbar to receive a light signal from, say, an optical fiber which is behind the backplane 10. The embodiment of FIG. 7 shows a convenient way of coupling such an optical fiber 80 to the optical busbar 36. The latter is similar to the optical busbar shown in FIGS. 3-6, in that it has a series of reflector surfaces 64, 66 etc. but differs in that the reflector surface 82 arranged to receive light from the optical fiber 80 is on the opposite side of the optical busbar 36, i.e. adjacent the backplane 10. The associated support member 84 has spigots 86 securing it to the backplane 10, and a lens 88 mounted in a hole 90 in the part of the support member 84, that is, on the side away from the backplane 10.

The optical fiber 80 is terminated in a connector 92 which houses a second lens 94. The connector 92 fits over the end of the support member 84 so that the axes of the lenses 88 and 94 are substantially aligned.

Thus, the light signal can be brought into the cabinet from the rear, i.e. behind the backplane, as is usual. It is fed into the optical busbar 36 via the connector 92, lenses 88, 94 and directed along the optical busbar 36 by the reflector surface 82. The other reflector surfaces 64, 66 etc. distribute the signal to the circuit cards as described with respect to FIG. 1.

Figure 8:
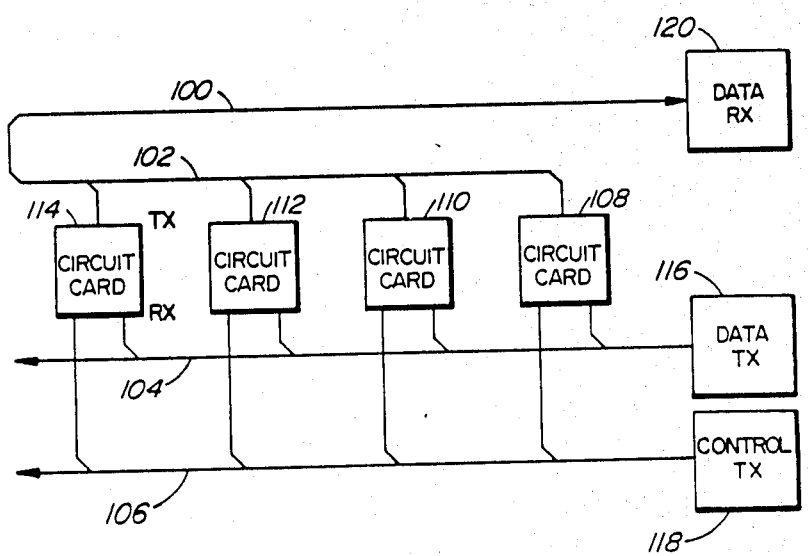
FIG. 8 is a schematic diagram of a set of four optical busbars used to interconnect components on a backplane.

In the practical embodiment illustrated in FIG. 8, four optical busbars 100, 102, 104 and 106 extend parallel to each other on a backplane-mounted support (not shown). One transmitter and two receivers are mounted on each of four circuit cards 108, 110, 112 and 114, respectively. The transmitters and receivers are connected to optical busbars 102 and 104, respectively. Optical busbar 104 is shown coupled at one end (light can, of course, be launched into these optical busbars through the end) to a transmitter 116 and is coupled via its reflectors to first ones of the receiver ports of circuit cards 108, 110, 112 and 114. The other receiver ports are coupled laterally to the optical busbar 106, which is coupled at its end to a control/supervisory transmitter 118.

It is preferred for the data signals in the optical busbars 102, 104 and 106 coupled to the circuit card to travel in the same direction. This simplifies synchronization. Accordingly, optical busbar 102 is coupled by a U-bend (actually two 90 degree bends such as disclosed in our copending patent application Ser. No. 906,708(now U.S. Pat. No. 4,717,247), to the fourth optical busbar 100, which carries the data signals in the opposite direction to the data receiver 120.

In either the embodiment of FIG. 1 or the embodiment of FIG. 7, it may be preferable for the inclined surface (68 or 82) which receives light from the transmitter to be larger than usual, for example the whole of the oblique cross-sectional area of the busbar.

Various modifications of the specific embodiments are possible without departing from the scope of the invention. For example, the rod may be of other polygonal shapes, such as hexagonal, triangular or octagonal, and the inclined reflector surfaces may be provided in the same surface as that from which the light emerges.

In preferred embodiments of the invention, the light source employs multimodal excitation, specifically with a range of angles of internal light rays of about 10 degrees. With such multimodal excitation, the spacing between aligned reflectors need not be particularly large to avoid shadowing of one reflector by the preceding reflector. In the exemplary embodiment, the spacing between the adjacent reflectors was about 50 mm, giving a ratio of reflector spacing to reflector diameter of about 150:1.

It will be appreciated that although the reflector surfaces in the specific embodiment will reflect only about 2-4% of the light travelling along the busbar, if light is being transmitted into the waveguide via such surfaces, they will reflect substantially all of the light. This is mainly because the lens system enables one to image the source onto the reflector so that substantially all of the light gets transmitted along the busbar. The difference is that the transmitted light is still concentrated into a few modes, whereas the light in the waveguide comprises many more modes.

Moreover, although the reflector means in the specific embodiment comprise planar surfaces, other types of reflective surfaces might be employed, for example the prismatic reflector surface disclosed and claimed in our copending application Ser. No. 906,708 (now U.S. Pat. No. 4,717,247), or other means employing total internal reflection.

An advantage of those embodiments of the invention which involve a row of reflectors in a straight line in the same surface of the waveguide, is that masking or "shadowing" of one reflector is not a significant problem because of the multimode transmission in the waveguide.

The specific embodiment comprises a so-called directional coupler inasmuch as the inclined surface at each tap point is inclined in one direction only. It is envisaged that a bidirectional coupler could be provided by forming two oppositely-inclined surfaces at each tapping point. Then one would reflect light to travel, or travelling in, one direction along the waveguide and the other would reflect light to travel, or travelling in, the opposite direction.

Of course, the oppositely-inclined surfaces might be spaced apart, perhaps to serve different circuit cards or different parts of the same card.

Although circular cavities are preferred for ease of mould manufacture, other shapes are comprehended by the invention; in particular, square or otherwise rectangular cross-section might be preferred because such a tap has maximum efficiency due to minimum loss of light.

It should be appreciated that the inclined surfaces may be provided in any combination of orientations to give 1:n distribution, n:1 concentration or multiplexing, or even n:m, i.e. plural transmitters to plural receivers.

What is claimed is:

1. Apparatus comprising a backplane, a plurality of circuit cards each associated with an optical element, and an optical busbar, said circuit cards being mounted upon said backplane substantially parallel with each other and substantially perpendicular to the backplane, said backplane having seating means for said optical busbar, said optical busbar comprising a rod of optically transmissive material having a planar surface along one side thereof, said optical busbar being mounted to said backplane with said planar surface positively located by said seating means, said rod of optically transmissive material having a row of diverter means along its length, the diverter means being spaced apart so as to correspond to the aforesaid optical element associated with said circuit cards, said diverter means being so disposed relative to said planar surface as to divert light travelling along said rod to emerge laterally through said planar surface at intervals corresponding to the spacing of said diverter means and impinge upon said optical element.

2. Apparatus as defined in claim 1, further comprising a plurality of lens means corresponding to said plurality of circuit cards, each lens means serving to couple light between a said diverter means and the said optical element associated with the corresponding one of said plurality of circuit cards.

3. Apparatus as defined in claim 2, wherein said lens means each comprises a first lens mounted upon said backplane and a second lens mounted upon said corresponding one of said plurality of circuit cards.

4. Apparatus as defined in claim 3, wherein each said first lens is positioned with said corresponding diverter means substantially coincident with the principal focus of said first lens.

5. An optical busbar comprising:
   means for defining an elongate waveguide for conveying light in a predetermined direction along its length, the waveguide having a planar surface extending along its length; and
   a plurality of reflectors of similar size spaced from and aligned with each other along the length of the waveguide and disposed along the side of the waveguide opposed to said planar surface, each reflector extending into the waveguide to obscure only a small part of its cross-sectional area and being arranged to divert light conveyed along the waveguide in said predetermined direction and incident upon the reflectors transversely to the length of the waveguide to emerge from the waveguide through the plane of said planar surface.

6. An optical busbar as defined in claim 5, wherein said means for defining an elongate waveguide comprises a rod of optically transmissive material, said planar surface comprising a longitudinal flat along one side of said rod.

7. An optical busbar as defined in claim 6, wherein said rod has a polygonal cross-sectional shape and said planar surface comprises one facet of the polyhedron.

8. An optical busbar as defined in claim 7, wherein each of said reflectors comprises an inclined surface formed as an oblique truncation of a respective cavity of elliptical cross-sectional shape.

9. An optical busbar as defined in claim 6, wherein each reflector has an effective reflecting area equal to about 2-4 percent of the cross-sectional area of said waveguide.

10. An optical busbar as defined in claim 6, wherein each said reflector comprises a reflective surface of a cavity in said elongate waveguide.

11. An optical busbar as defined in claim 10, wherein each said reflective surface comprises an oblique truncation of said cavity.

12. An optical busbar as defined in claim 6, further comprising at least one reflector means disposed in the side of the rod opposite to said planar surface, the arrangement being such that light impinging upon said at least one reflector means from a direction lateral to the rod, will be reflected to impinge upon said plurality of reflectors.

13. An optical busbar as defined in claim 5, wherein said means for defining an elongate waveguide comprises a rod of optically transmissive material.

14. Apparatus comprising:
a backplane and an optical busbar mounted upon the backplane, the optical busbar comprising:
means for defining an elongate waveguide for conveying light in a predetermined direction along its length, the waveguide having a planar surface extending along its length, said planar surface being parallel to and spaced from the backplane, and a plurality of diverter means spaced from and aligned with each other along the length of the waveguide, each diverter means extending into the waveguide to obscure only part of its cross-sectional area and being arranged to divert light conveyed along the waveguide in said predetermined direction and incident upon the diverter means transversely to the length of the waveguide to emerge from the waveguide through the plane of said planar surface.

15. Apparatus as defined in claim 14, wherein said means for defining an elongate waveguide comprises a rod of optically transmissive material, said planar surface comprising a longitudinal flat along one side of said rod, said diverter means being disposed along the side of said rod opposed to said flat and arranged so as to divert light to pass across the rod and emerge from said flat.

16. Apparatus as defined in claim 15, wherein the busbar further comprises at least one reflector means disposed in the side of the waveguide opposite to said planar surface, the arrangement being such that light impinging upon said at least one reflector means from a direction lateral to the waveguide, will be reflected to impinge upon said plurality of diverter means.

17. Apparatus comprising:
a backplane; and
an optical busbar mounted upon the backplane, the optical busbar comprising:
means for defining an elongate waveguide for conveying light in a predetermined direction along its length, the waveguide having a planar surface extending along its length, said planar surface being parallel to and spaced from the backplane; and a plurality of reflectors of similar size spaced from and aligned with each other along the length of the waveguide and disposed along the side of said waveguide opposed to said planar surface, each reflector extending into the waveguide to obscure only a small part of its cross-sectional area and being arranged to divert light conveyed along the waveguide in said predetermined direction and incident upon the reflectors transversely to the length of the waveguide to emerge from the waveguide through the plane of said planar surface.

18. Apparatus as defined in claim 17, wherein said means for defining an elongate waveguide comprises a rod of optically transmissive material, said planar surface comprising a longitudinal flat along one side of said rod.

19. Apparatus as defined in claim 18, wherein each reflector has an effective reflecting area equal to about 2-4 percent of the cross-sectional area of said waveguide.

20. Apparatus as defined in claim 19, wherein each said reflector comprises a reflective surface of a cavity in said elongate waveguide, wherein each said reflective surface comprises an oblique truncation of said cavity.

21. Apparatus as defined in claim 20, wherein the busbar further comprises at least one reflector means disposed in the side of the waveguide opposite to said planar surface, the arrangement being such that light impinging upon said at least one reflector means from a direction lateral to the waveguide, will be reflected to impinge upon said plurality of reflectors.

* * * * *